United States Patent
Jain

[11] Patent Number: 6,141,340
[45] Date of Patent: *Oct. 31, 2000

[54] METHOD FOR MULTI-MEDIA TRANSACTIONS

[75] Inventor: Shri P. Jain, Marlboro, N.J.

[73] Assignee: AT&T Corp, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/852,084

[22] Filed: May 6, 1997

[51] Int. Cl.⁷ .................................................. H04L 12/66
[52] U.S. Cl. ............................................................ 370/352
[58] Field of Search ..................................... 370/352, 351, 370/264, 354, 355, 356, 389, 401

[56] References Cited

U.S. PATENT DOCUMENTS

| | | | |
|---|---|---|---|
| 5,291,551 | 3/1994 | Conn et al. | 379/265 |
| 5,365,577 | 11/1994 | Davis et al. | |
| 5,428,608 | 6/1995 | Freeman et al. | |
| 5,502,727 | 3/1996 | Catanzaro et al. | |
| 5,787,088 | 7/1998 | Dagdeviren et al. | |
| 5,884,032 | 3/1999 | Bateman et al. | 395/200.34 |
| 5,889,774 | 3/1999 | Mirashrafi et al. | 370/352 |
| 5,940,479 | 8/1999 | Guy et al. | 379/93.01 |
| 6,005,859 | 12/1999 | Harvell et al. | 370/352 |

FOREIGN PATENT DOCUMENTS

| | | |
|---|---|---|
| 8-331134 | 12/1996 | Japan. |
| 9-168033 | 6/1997 | Japan. |
| 10-21008 | 8/1998 | Japan. |

OTHER PUBLICATIONS

Nikkei Communications, Nikkei BP, Nov. 4, 1996 No. 233, pp. 98–105.

N. Muller: "Dial 1–800–Internet," Byte, vol. 21, No. 2, Feb. 1996, Peterborough, NH, US, pp. 83–88 (the whole document).

"Workstation Communications System" IBM Technical Disclosure Bulletin, vol. 37, No. 9, Sep. 1994, Armonk, NY, US, pp. 101–104 (the whole document.

*Primary Examiner*—Ajit Patel
*Attorney, Agent, or Firm*—Robert B. Levy

[57] ABSTRACT

A multimedia transaction between a local and a remote transaction systems (10 and 12) is facilitated by a multimedia interface (16) within each system. The multimedia interface (16) associated with each transaction system serves to signal a telephone (18, 20) associated with the other transaction system to go off hook while the transaction systems are exchanging data when a voice conversation between the transaction systems is desired. Further, the multimedia interface (16) serves to convert the analog speech from the telephone of its associated transaction system into digital voice packets for transmission with the digital signals to the other the transaction system. Also, each multimedia interface converts the digital voice packets received at its associated transaction system from the other transaction system into analog voice information for receipt at the associate telephone.

9 Claims, 5 Drawing Sheets

METHOD FOR MULTI-MEDIA TRANSACTIONS

TECHNICAL FIELD

This invention relates to a technique for enabling a one party to conduct a multimedia transaction (voice and data) with another party across a single phone line.

BACKGROUND ART

There is growing interest in electronic commerce, whereby individuals and/or entities can transact business with other individuals and/or entities via interconnected networks, such as the INTERNET. Electronic commerce offers advantages to both buyers and sellers. With electronic commerce, a buyer may access many more sellers than could be achieved via conventional methods of face commerce. Thus, with electronic commerce, buyers can potentially achieve a lower purchase price, as well as a wider selection of goods and/and or services. By the same token, electronic commerce affords sellers a larger market place, and access to a larger number of buyers.

Much of the electronic commerce presently conducted between buyers and sellers occurs by the exchange of data in the form of graphics and/or text. Typically, a buyer seeking to purchase goods and/or services electronically initiates the transaction by first establishing a data link with the seller. For example, if the seller possesses a website on the World-Wide Web portion of the INTERNET, the buyer initially makes a connection via a computer, to an INTERNET Service Provider. Once connected, the buyer then enters the Universal Resource Locator (URL) associated with the seller to access that seller's web site. After the buyer has accessed the seller's web site, the buyer enters the information needed to complete the transaction.

Not infrequently, a buyer making an electronic transaction in the manner described, may wish to speak personally with the seller to ask a question or to discuss some aspect of the transaction. Heretofore, conducting a voice conversation with the seller, while simultaneously conducting an exchange of data (thereby achieving a "multimedia" transaction), has not proven convenient. In most instances, a buyer has to initiate a voice conversation on a telephone line separate from the line carrying data between the buyer and seller. Many buyers do not have the luxury of separate phone lines for voice and data and are thus unable to conduct a multimedia transaction.

Thus, there is need for a technique for conducting a multimedia transaction (e.g., a transaction in which voice and data are exchanged) across a single telephone line between two parties, such as a buyer and seller.

BRIEF SUMMARY OF THE INVENTION

Briefly, in accordance with the invention, a multimedia transaction between first and second parties may be conducted across a single communications channel, such as a telephone line or the like. To conduct such a transaction, one of the two parties establishes a data connection from that party's computer to a computer associated with the other party via the communications channel. In this way, the parties may exchange data, in the form of graphics and/or text. Should either party wish to simultaneously conduct a voice conversation with the other, the party seeking to initiate the voice conversation signals the other party of such a desire. The party receiving such signal then goes off-hook on a telephone that is coupled to the receiving party's computer, causing that computer to signal the initiating party to go off-hook on its telephone, if that party has not already done so. Once both parties have gone off-hook, then as each party speaks through its associated telephone, an analog-to-digital converter within that party's computer converts the voice into digital signals that are packetized for transmission to the other party's computer for conversion by a digital-to-analog converter back into voice. The digitized voice signals generated by each party are transmitted together with the digital data signals representing text and/or graphics so that the parties can thus conduct a multimedia transaction (e.g., voice and data ) without the need for separate physical communications channels for the voice and data respectively.

DETAILED DESCRIPTION

Figure 1:
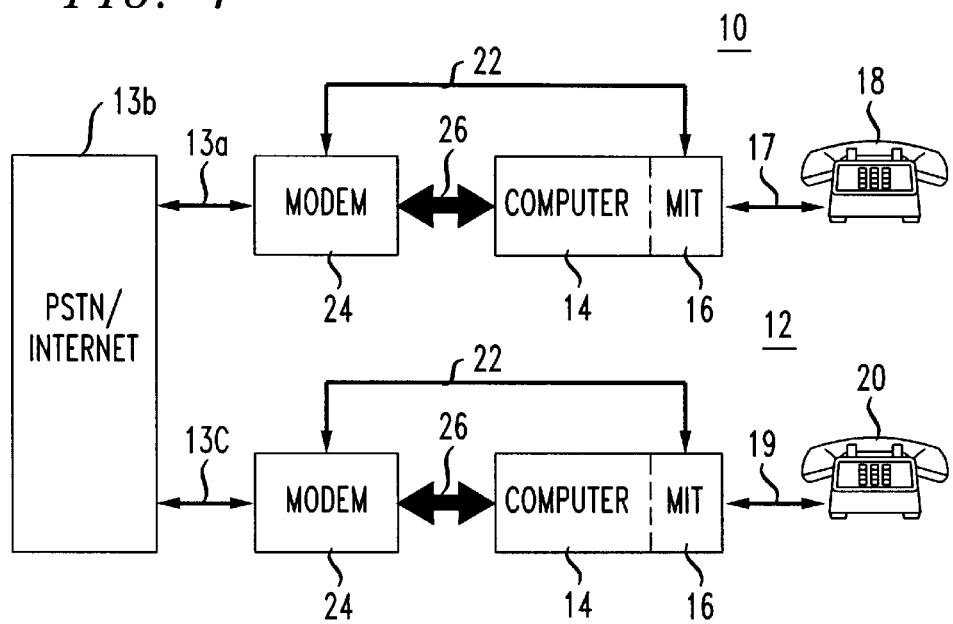
FIG. 1 is a block schematic diagram of a multimedia transaction system in accordance with a first embodiment of the invention.

FIG. 1 illustrates a pair of media information transaction systems 10 and 12, respectively, in accordance with the present invention, for enabling a first and second parties to conduct a multimedia transaction (i.e., a simultaneous exchange of voice and data) across a single communications channel 13, represented by a pair of telephone lines 13a—13a linked via a network 13b that may include the Public Switched Telephone Network (PSTN), alone or in combination with the INTERNET. To differentiate between them, the transaction system 10 is referred to as the "local" transaction system. Conversely, the transaction system 12 is referred to as the "remote" transaction system. In the embodiment illustrated in FIG. 1, the local and remote transaction systems 10 and 12, respectively are configured identically. Hence, only the local transaction system 10 system will be described in detail. Except as otherwise described, like reference numbers are used to identify like elements.

The local transaction system 10 includes a computer 14 in the form of a personal computer as are well known. In that regard, the computer 14 typically includes a processor, random access memory, magnetic storage, a keyboard, a mouse, as well as a monitor (not shown). In accordance with the invention, the computer 14 includes a Multimedia Information Service Transaction (MIT) interface 16 described in greater detail with respect to FIG. 3. The MIT interface 16 is connected via an analog telephone line 17 to a telephone 18 (hereinafter, the "local" telephone"). (The MIT 16 associated with the remote transaction system 12 is connected, via an analog line 19, to a telephone 20 (hereinafter, the "remote" telephone").

The MIT 16 within the computer 14 of the transaction system 10 is coupled by an analog connecting telephone line 22 to a modem 24. The modem 24 is linked by a data bus 26 to the computer. While shown separately, the modem 24 could easily be incorporated within, be internal to, the computer 14. The modem 24 of the local transaction system 10 is coupled, via the phone line 13a to the Public Switched Telephone Network 13b. The modem 24 of the remote transaction system 12 is coupled via the line 13c to the Public Switched Telephone Network 13b. The local and transaction systems 10 and 12, respectively, by virtue of their respective MIT interface 16, may exchange both digital data and digitized voice packets, transmitted in analog format, to facilitate a multimedia transaction.

Figure 2:
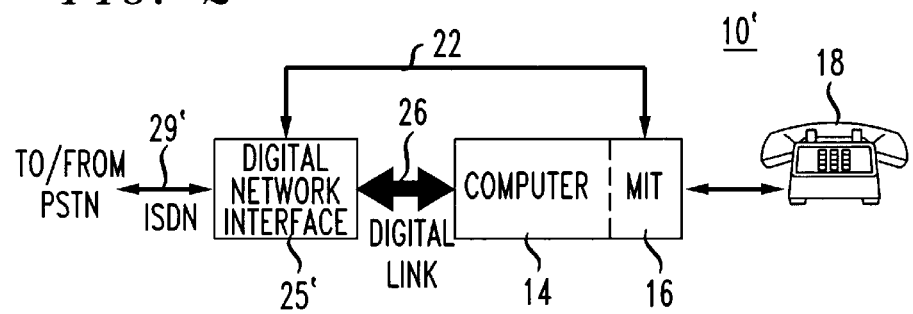
FIG. 2 shows a portion of an alternate embodiment of a multimedia transaction system in accordance with the invention.

Referring to FIG. 2, there is shown an alternate preferred embodiment 10' of a transaction system. The transaction system 10' is similar in most respects to the transaction system 10 of FIG. 1 and like elements have are identified by like reference numbers. Unlike the transaction system 10 of FIG. 1 that is linked via analog the analog line 13a to the PSTN 13b, the transaction system 10' of FIG. 2 is linked via an Integrated Services Digital Network (ISDN) line 29 to the PSTN (not shown). Further, the transaction system 10' includes a digital network interface 25' in place of the modem 24 of FIG. 1 for interfacing the computer 14 to the ISDN phone line 29. The network interface 25' serves to couple digital signals from the computer 14 onto the ISDN line 29 while simultaneously coupling analog signals received from the MIT 16, via the analog connecting line 22, onto the line 29. The transaction system 10 transmits digital information and digital voice packets (as will become better understood hereinafter, as digital information across the ISDN line 29. In all other respects, the transaction system 10' operates in the same manner as the system 10 of FIG. 1 as will be discussed hereinafter.

Note that the MIT 16 could be configured for use with both a digital incoming line 29' as well as a connecting voice signal line 22 that is digital rather than analog as described. When the connecting line 22 is digital, then the telephone instrument 22 would also be digital in nature.

Figure 3:
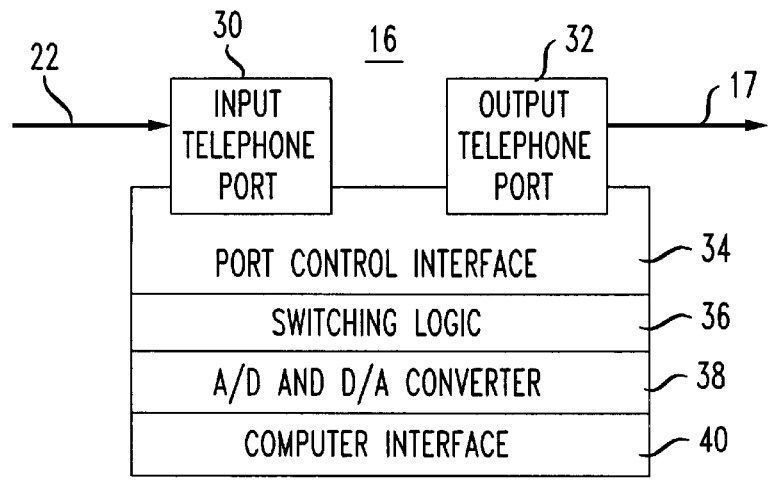
FIG. 3 is block schematic diagram of a Multimedia Information Transaction (MIT) interface for use with the multimedia transactions systems of FIGS. 1 and 2.

FIG. 3 illustrates the details of the MIT interface 16 within the computer 14 of each of the local and remote transactions systems 10 and 12, respectively, of FIG. 1. The MIT interface 16 includes an input port 30 coupled to the telephone line 22 that is linked to the modem 24, Further, the MIT interface 16 associated with the local transaction system 10 includes an output port 32 coupled to the line 17 that is linked to the local telephone 18. (In the case of the remote transaction system 12, the port 32 of the MIT interface 16 is linked by the line 19 to the remote telephone 20.) The ports 30 and 32 of the MIT interface 16 are managed by a port control interface 34. The port control interface 34 is controlled by a switching logic circuit 36 to provide a direct coupling between the ports during selected intervals (as discussed below). The switching logic circuit 36 is responsive to commands from the computer 14 of FIG. 1 coupled via a computer interface 40 within the MIT interface 16.

The MIT interface 16 of FIG. 3 also includes a combination Analog-to-Digital (A/D) and Digital-to-Analog (D/A) converter 38. As will be discussed below, during intervals other than when the ports 30 and 32 are directly linked, the converter 38 converts analog signals, (i.e., voice) received from its associated telephone set into digital signals. Also, the converter 38 converts digitized voice signals received by the each transaction system from the other transaction system into analog signals (voice) for receipt by the telephone associated with the MIT interface 16.

Figure 4:
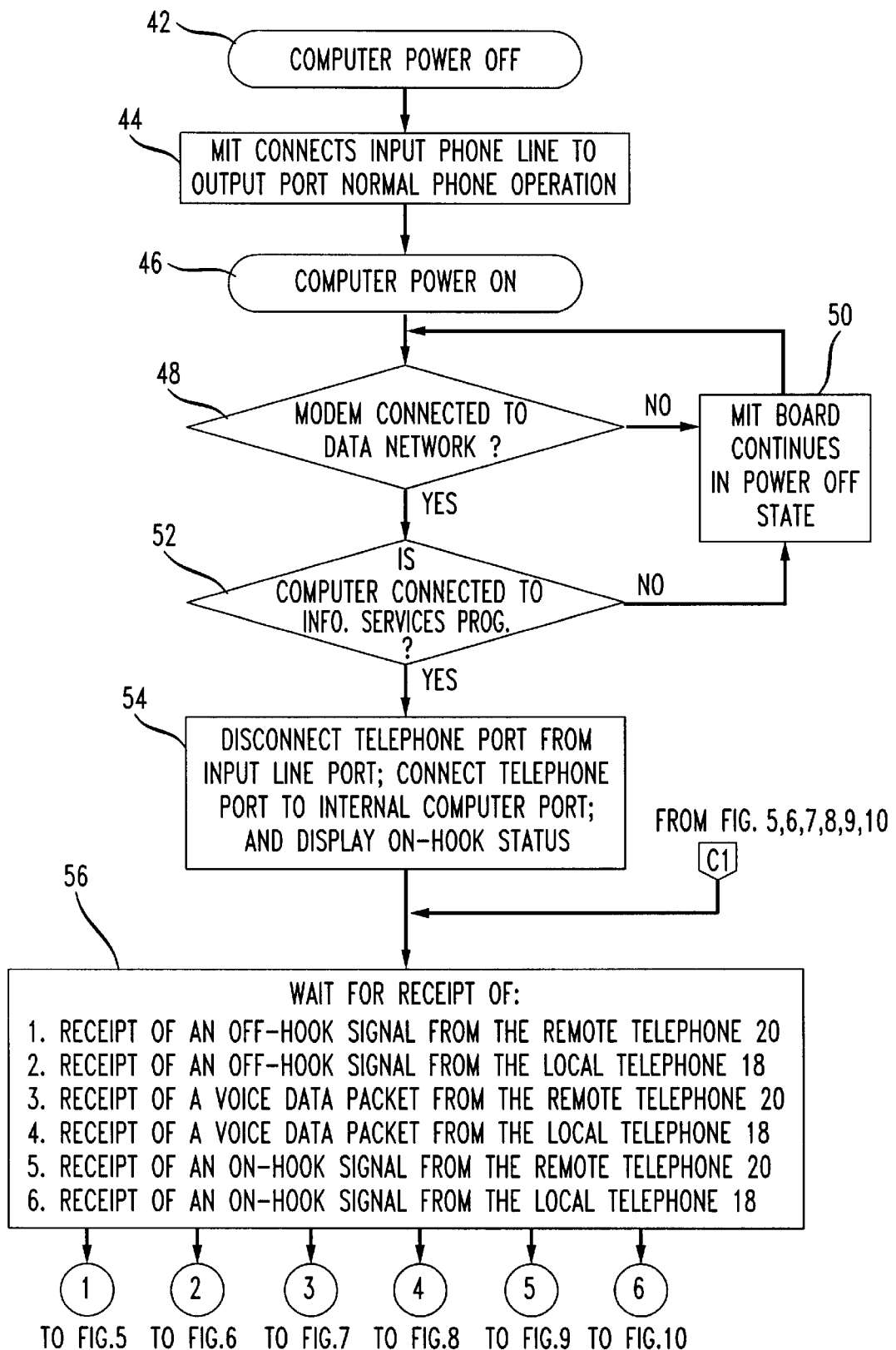
FIG. 4 is a flow chart diagram illustrating the manner in which the MIT interface of FIG. 3 operates.

The manner in which the MIT interface 16 within with the local transaction system 10 facilitates a multimedia transaction with the remote transaction system 12 may best be understood by reference to the flow chart of FIG. 4. (The operation of the MIT interface 16 within the remote transaction system 12 is identical and will not be described.) At the outset, the computer 14 of the transaction system 12 is assumed to be powered off (step 42). While the computer 14 is powered off, the MIT interface 16 within the computer connects the input phone line 22 to the output line 17 (step 44). With the telephone lines 17 and 22 connected via the MIT interface 16, the telephone 18 associated with the transaction system 10 is linked through the modem 24 to the line 13a. (Assuming no power to the computer 14 of the transaction system 12, the telephone 20 will likewise be connected via its associated MIT interface 16 to line 13c.) Under such circumstances, both telephones 18 and 20 can be used normally to initiate and receive calls via the PSTN 13b.

Once the computer 14 of the transaction system 10 is powered on (step 46). the operational status of the MIT interface 16 may change, depending on certain conditions. In particular, the operational status of the MIT interface 16 depends on whether the modem 24 of the transaction system is connected to a data network, and whether the computer 14 is connected to a network, such as the INTERNET, or a network of an information services provider. After being powered on, the computer 14 checks whether its modem 24 is connected to a data network (step 48). As long as the modem 24 is not connected to a data network, the MIT interface 16 remains in the power off state (step 50). As discussed above, while in the power-off state, the MIT interface 16 associated with the local transaction system 10 of FIG. 1 couples the telephone line 22 of FIG. 1 to telephone line 17, allowing normal operation of the local telephone 18.

Should the modem 24 indeed be connected to a data network during step 48, then a check is made during step 52 whether the computer 14 is connected to the INTERNET or an information services provider network. While computer 14 remains unconnected during step 52, the MIT interface 16 remains in its power off state (step 50).

Should the computer 14 be connected to a network during step 52, then the MIT interface 16 disconnects the telephone line 17 from the line 22. Instead, the MIT interface 16 connects the output port 32 of FIG. 3 to the combined A/D and D/A converter 38 (step 54). In this way, the MIT interface 16 of the local transaction system 10 of FIG. 1 can supply the corresponding local telephone 18 with analog voice signals in response to digitized voice signals received from the remote transaction system 12. (By the same token, the MIT interface 16 associated with the remote transaction system 12 can now supply the corresponding remote telephone 20 with analog voice signals in accordance with digitized voice signals received from the local transaction system 10.)

Further, during step 54, the MIT interface 16 associated with the local transaction system 10 can now convert analog voice signals received from the telephone 18 into digitized voice signals that are packetized by the computer 14 with digital data representing graphics and/or text for transmission to the remote transaction system 12. (Similarly, the MIT interface 16 associated with the remote transaction system 10 can now convert analog voice signals received from the telephone 18 into digitized voice signals that are packetized by the computer 14, with digital data representing graphics and/or text, for transmission to the local transaction system 10.) Also, during step 54, the MIT interface 16 associated with the local transaction system signals the computer 14 to display an icon indicative of the on-hook status of the telephone 18, presuming such is the case.

Following step 52, the MIT interface 16 now waits for one of the following events (step 56):

1. Receipt of an off-hook signal from the remote telephone 20;

2. Receipt of an off-hook signal from the local telephone 18;

3. receipt of a voice data packet from the remote telephone 20;

4. receipt of a voice data packet from the local telephone 18;

5. receipt of an on-hook signal from the remote telephone 20; and 6. receipt of an on-hook signal from the local telephone 18.

Figure 5:
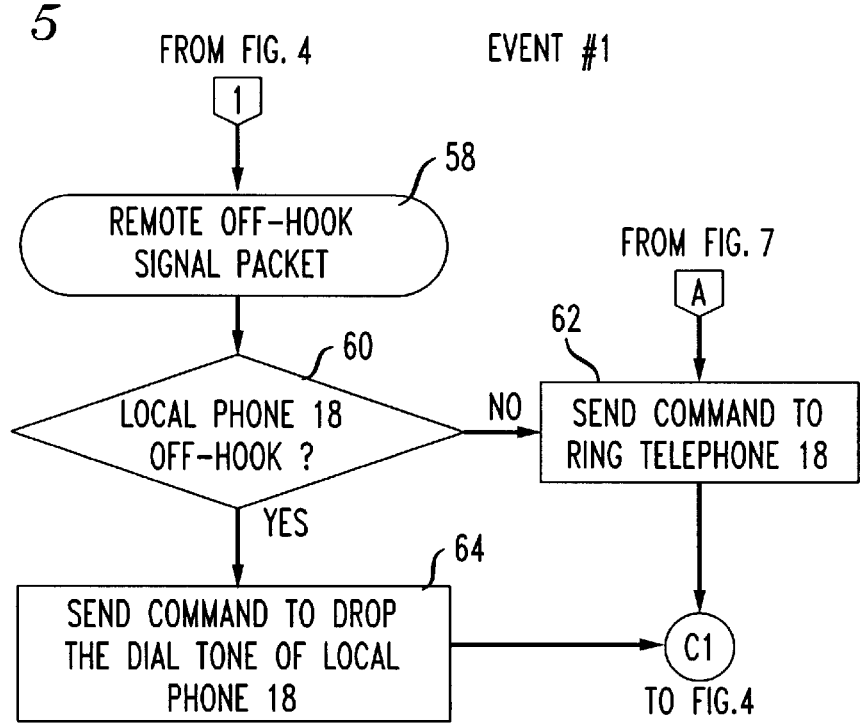
FIG. 5 is flow chart diagram of a sub-routine executed by the transaction interface of FIG. 3 upon receipt of an off-hook signal from a remote party.

FIG. 5 illustrates, in flow chart form, the steps performed by the MIT interface 16 in response to an off-hook signal from the remote telephone 20 of FIG. 1 (Event #1). When the remote telephone 20 goes off hook, the remote transaction system 12 of FIG. 1 sends a signal packet that is received by MIT interface 16 within the local transaction system 10 (Step 58). Thereafter, the MIT interface 16 associated with the local transaction system 10 checks the condition of the local telephone 18 to determine whether the phone is off-hook (step 60). If the local telephone 18 is not off-hook, then a command is sent, via the MIT interface 16, to ring the local phone (step 62) after which time, the MIT interface 16 returns to step 56 of FIG. 4 via branch C1 to await another one of the six events described previously. Should the local telephone 18 already be off-hook, then a command is sent via the MIT interface 16 to drop the previously received dial tone (step 64) before returning to step 56 of FIG. 4 via branch C1 to await another one of the six events described previously. (Ordinarily, even when the local telephone 18 is coupled to the converter 38, the phone will receive a dial tone. However, when the remote telephone 20 goes off hook, it is presumed that a voice conversation between the local and remote phones is desired, thus the need to drop the dial tone.)

Figure 6:
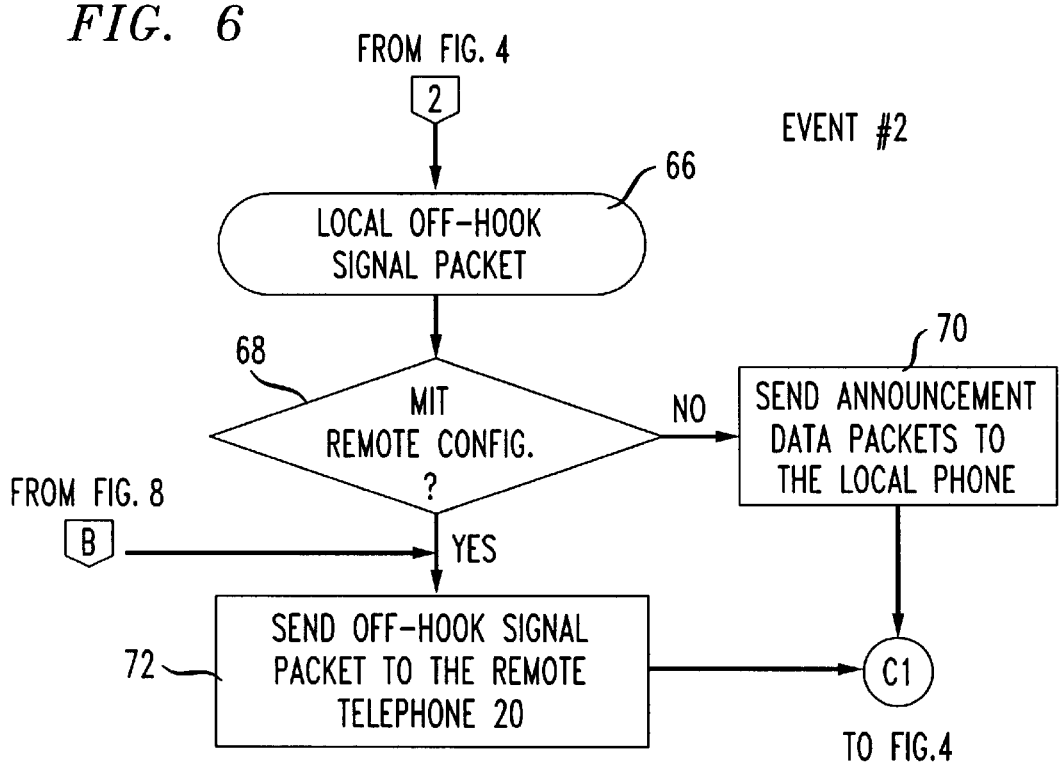
FIG. 6 is flow chart diagram of a second sub-routine executed by the transaction interface of FIG. 3 upon receipt of an off-hook signal from the local party.

FIG. 6 illustrates, in flow chart form, the steps performed by the MIT interface 16 associated with the local transaction system 10 of FIG. 1 in response to an off-hook signal from the local telephone 18 of FIG. 1 (Event #2). The off-hook signal from the local telephone 18 is received at the MIT interface 16 as a signal packet (step 66). Upon receipt of the off-hook signal from the local telephone 18, the MIT interface 16 checks whether it is configured for local remote operation (step 68). In other words, the MIT 16 determines whether it is associated with the remote transaction system 12, that is whether the remote end has a similar capability for interfacing with the MIT (e.g. the remote end has a telephone set 20). If the MIT interface 16 is not configured for remote operation, then an announcement packet is sent to the local telephone 18 (step 70) before returning to step 56 via branch C1 to await another one of the six events described previously. When the MIT interface 16 is configured for remote operation, then the MIT interface 16 sends a signal (such as a ringing signal) (step 72) to alert the remote party to cause the remote telephone 20 to go off hook before returning to step 56 via branch C1 to await another one of the six events described previously.

Figure 7:
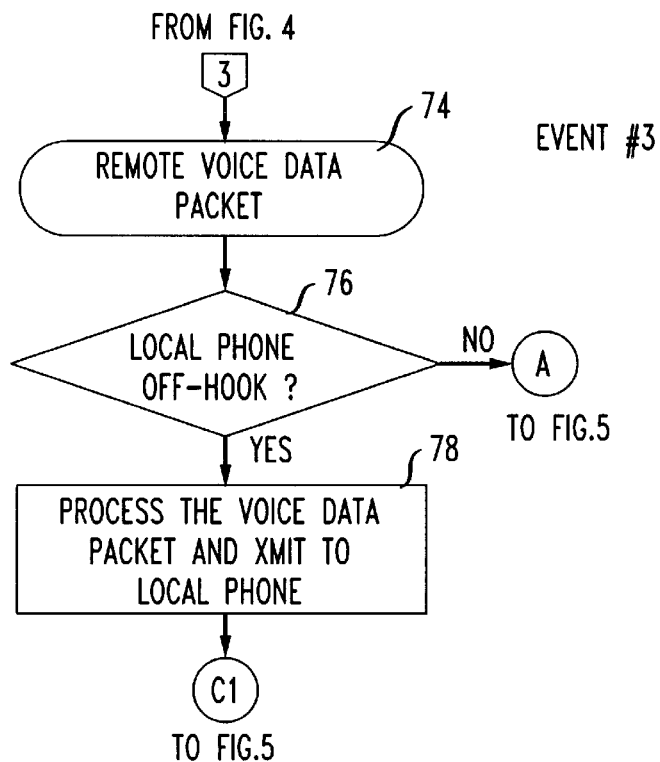
FIG. 7 is flow chart diagram of a third sub-routine executed by the transaction interface of FIG. 3 upon receipt of digitized voice signal packet from the remote party.

FIG. 7 illustrates, in flow chart form, the steps performed by the MIT interface 16 associated with the local transaction system 10 of FIG. 1 upon receipt of a voice data packet from the remote transaction system 12 of FIG. 1 (Event 3). The MIT interface 16 receives the remote data packet (step 74) and thereafter checks whether the local telephone 18 is off-hook (step 76). If the local telephone 18 is not off-hook, then the MIT 16 proceeds, via branch A, to step 62 in FIG. 5. Otherwise when the local telephone 18 is off hook, the MIT 16 processes the digitized voice packet received from the remote transaction system 12 to convert the voice packet to an analog voice signals for receipt by the local telephone 18 (step 78). Thereafter, the MIT 16 returns to step 56 of FIG. 4 via branch C1 to await another one of the six events described previously.

Figure 8:
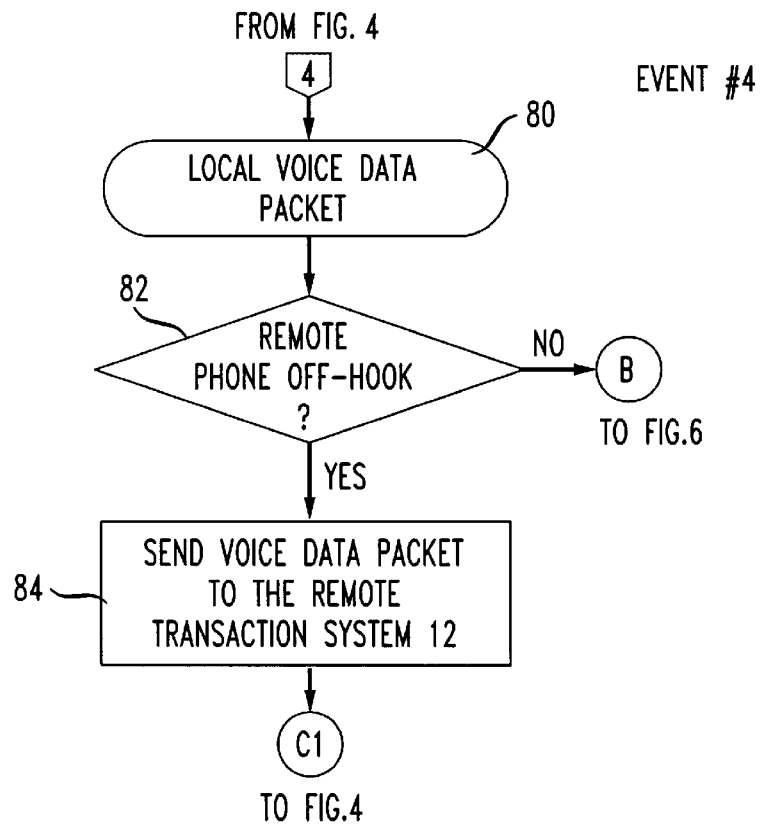
FIG. 8 is flow chart diagram of a fourth sub-routine executed by the transaction interface of FIG. 3 upon receipt of digitized voice signal packet from the local party.

FIG. 8 illustrates, in flow chart form, the steps performed by the MIT interface 16 associated with the local transaction system 10 of FIG. 1 to process analog voice signals entered via the local telephone 18 (Event 4). The MIT interface 16 receives analog voice signals from the local telephone 18 (step 80) and upon their receipt, the MIT interface checks whether the remote telephone 20 is off-hook (step 82). If the remote telephone 20 is not off-hook, the MIT interface 16 proceeds to step 70 of FIG. 6 via branch B. Otherwise, the MIT interface 16 sends digitized voice data (representing the analog voice entered via the local telephone 18 that has been converted into digitized signals via the converter 35 of FIG. 3) to the remote transaction system 12 (step 84) before returning to step 56 via branch C1 to await another one of the six events described previously.

Figure 9:
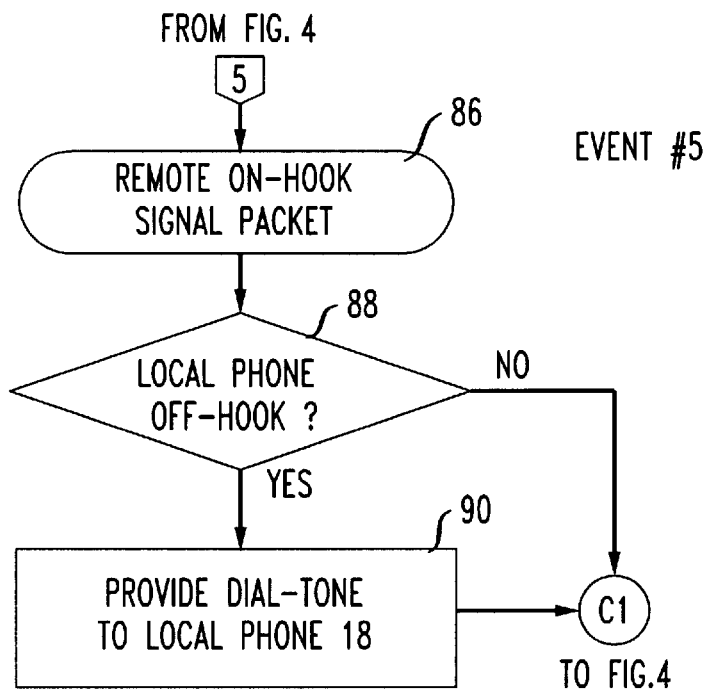
FIG. 9 is flow chart diagram of a fifth sub-routine executed by the transaction interface of FIG. 3 upon receipt of an on-hook signal from the remote party.

FIG. 9 illustrates, in flow chart form, the steps performed by the MIT interface 16 associated with the local transaction system 10 upon receipt of an on-hook signal from the remote telephone 20 of FIG. 1. Upon receipt of an on-hook signal from the remote telephone 20 (step 86), the MIT interface 16 interface checks whether the local telephone 18 is off-hook (step 88). If the local telephone 18 is not off-hook, then the MIT interface 16 proceeds to step 56 of FIG. 4 via branch C1. Otherwise, the MIT interface 16 provides dial tone, or some other type of signal to the local telephone 18 to indicate the other party has disconnected (step 90) before returning to step 56 via branch C1 to await another one of the six events described previously.

Figure 10:
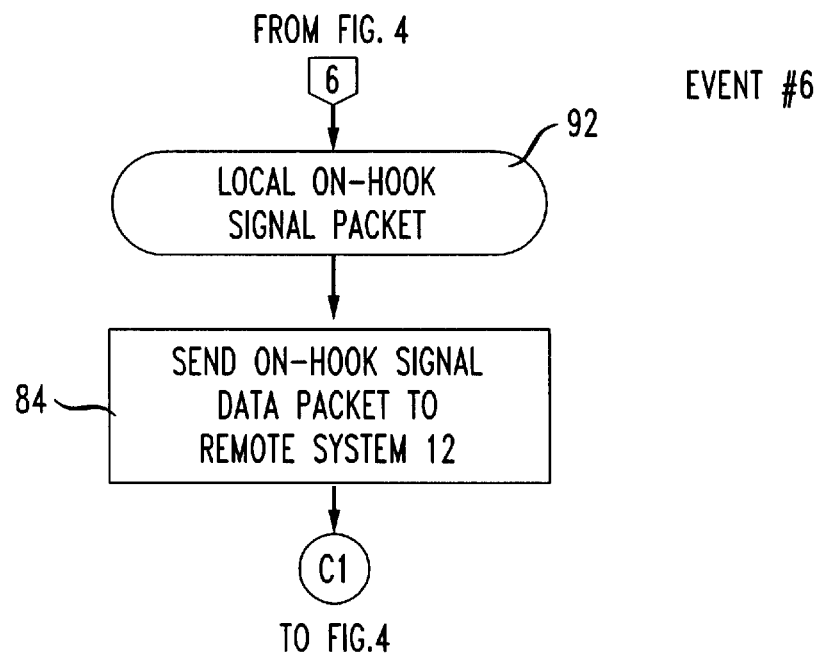
FIG. 10 is flow chart diagram of a sixth sub-routine executed by the transaction interface of FIG. 3 upon receipt of an on-hook signal from the local party.

FIG. 10 illustrates, in flow chart form, the steps performed by the MIT interface 16 following receipt of an on-hook signal from the local telephone 18. Upon receipt of the on-hook signal from the local telephone 18 (step 92), the MIT interface 16 sends an on-hook signal to the remote transaction system 12 of FIG. 1 (step 94) before returning to step 56 via branch C1 to await another one of the six events described previously.

As may now be appreciated, the MIT interface 16 associated with the remote transaction system 12 operates in the much the same manner as described with respect with to the MIT interface associated with the local transaction system 10. The only difference is that the MIT interface 16 associated with the remote transaction system 12 regards the local transaction system 10 as being remote. Thus, with regard to the MIT interface 16 of the remote transaction system 12, the reference to in FIGS. 4–10 to local and remote transaction systems would be reversed.

The foregoing describes a technique for conducting a multimedia transaction between two transaction systems 10 and 12 across a single telecommunication line 28.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for facilitating a multimedia transaction between a first and second party across a communications channel, comprising the steps of:

establishing a data link across the communications channel between a first computer associated with the first party and a second computer associated with the second party;

exchanging non-voice digital data between the first and second computers;

going off-hook on a first telephone directly connected to the first computer so that the first telephone communicates directly with the first computer;

transmitting a signal from the first computer to the second computer to cause the second computer to signal the second party to go-off-hook on a second telephone directly connected to the second computer so that said second telephone, once off-hook, now communicates directly with said second computer;

receiving analog voice information at the first and second computers from the first and second telephones, respectively;

converting, at the first and second computers, the analog voice information into digital voice packets for transmission with the digital data to each of the second and first computers, respectively, and converting, at each of the first and second computers, the digital voice packets into analog voice signals for receipt by each of the first and second telephones, respectively, while said first and second computers are exchanging non-voice digital data.

2. The method according to claim 1 wherein the digital data and the digital voice packets are transmitted across the communication channel in an analog format.

3. The method according to claim 1 wherein the digital data and the digital voice packets are transmitted across the communication channel in a digital format.

4. The method according to claim 1 wherein the data link is established across the communications channel through interconnected networks.

5. The method according to claim 4 wherein the interconnected networks comprise the INTERNET.

6. The method according to claim 1 wherein the digital data includes text.

7. The method according to claim 1 wherein the digital data includes graphics.

8. The method according to claim 1 wherein analog voice information from each of the first and second telephones is transmitted via each of the first and second computers, respectively, to a Public Switched Telephone Network, without any conversion to digital voice packets, during intervals other than when a data link is established across the communications channel between the first and second computers.

9. A method for facilitating a multimedia transaction between a first and second party across a communications channel, comprising the steps of:

communicating data across the communications channel between a first computer associated with the first party and a second computer associated with the second party so that the first and second computers exchange non-voice digital data between themselves;

carrying a signal from the first computer to the second computer in response to an off-hook condition of a first telephone directly connected to the first computer so that the first telephone communicates directly with the first computer, the signal carried from the first computer to the second computer causing the second computer to signal the second party to go-off-hook on a second telephone directly connected to the second computer so that said second telephone, once off-hook, now communicates directly with said second computer;

receiving from the first and second computers digital voice packets for transmission to the second and first computers, respectively, the digital voice packets received from the first and second computer representing analog speech signals from the first and second telephone sets digitized by said first and second computers, respectively, and combined with the digital data to each of the second and first computers, respectively, the digital voice packets passing between the first and second computers while said first and second computers exchange non-voice digital data.

* * * * *